US012692074B1

(12) United States Patent

Krishnamoorthy et al.

(10) Patent No.:  US 12,692,074 B1
(45) Date of Patent:       Jul. 28, 2026

(54) SYSTEMS AND METHODS FOR CREATING WALKWAYS IN HEAVY MACHINERY AND EQUIPMENT

(71) Applicant: Amazon Technologies, Inc., Seattle, WA (US)

(72) Inventors: Ganesh Krishnamoorthy, Seattle, WA (US); Michael Alan Bray, Elkhorn, NE (US); Vivek S. Narayanan, Franklin, TN (US)

(73) Assignee: Amazon Technologies, Inc., Seattle, WA (US)

( * ) Notice: Subject to any disclaimer, the term of this patent is extended or adjusted under 35 U.S.C. 154(b) by 1065 days.

(21) Appl. No.: 17/853,156

(22) Filed: Jun. 29, 2022

(51) Int. Cl.
B65G 1/10      (2006.01)
B65G 1/04      (2006.01)
B65G 1/137      (2006.01)

(52) U.S. Cl.
CPC ............. B65G 1/10 (2013.01); B65G 1/0492 (2013.01); *B65G 1/1373* (2013.01)

(58) Field of Classification Search
CPC ....... B65G 1/10; B65G 1/0492; B65G 1/1373
See application file for complete search history.

(56) References Cited

U.S. PATENT DOCUMENTS

| | | | |
|---|---|---|---|
| 2020/0407178 A1* | 12/2020 | Battles | B65G 1/0478 |
| 2022/0097966 A1* | 3/2022 | Brady | B65G 1/10 |
| 2023/0142454 A1* | 5/2023 | Heggebø | B65G 1/065 700/218 |

* cited by examiner

*Primary Examiner* — Kyle O Logan
(74) *Attorney, Agent, or Firm* — Eversheds Sutherland (US) LLP

(57)            ABSTRACT

Systems, methods, and apparatuses are disclosed for creating walkways in heavy machinery and equipment. In one embodiment, an example system may include a first module, a second module coupled to the first module, where the second module comprises a first track and a second track, a third module coupled to the first module and the second module, where the third module has a container matrix configured to support a first set of containers disposed along a lower portion of the system and a second set of containers disposed along an upper portion of the system, and a first actuation system configured to actuate the first set of containers from a first position to a second position, where the first set of containers is vertically aligned with the first track in the second position.

20 Claims, 9 Drawing Sheets

SYSTEMS AND METHODS FOR CREATING WALKWAYS IN HEAVY MACHINERY AND EQUIPMENT

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. In addition, robust handling equipment for objects, such as items, packages, containers, and so forth, may be helpful in improving fulfillment center operations, reducing risk of injury, and other benefits. Moreover, improvements in various operations of order fulfillment, such as improvements to picking technology, sorting technology, packing technology, and so forth may be desired, such that manual efforts can be redirected to different tasks.

Figure 1:
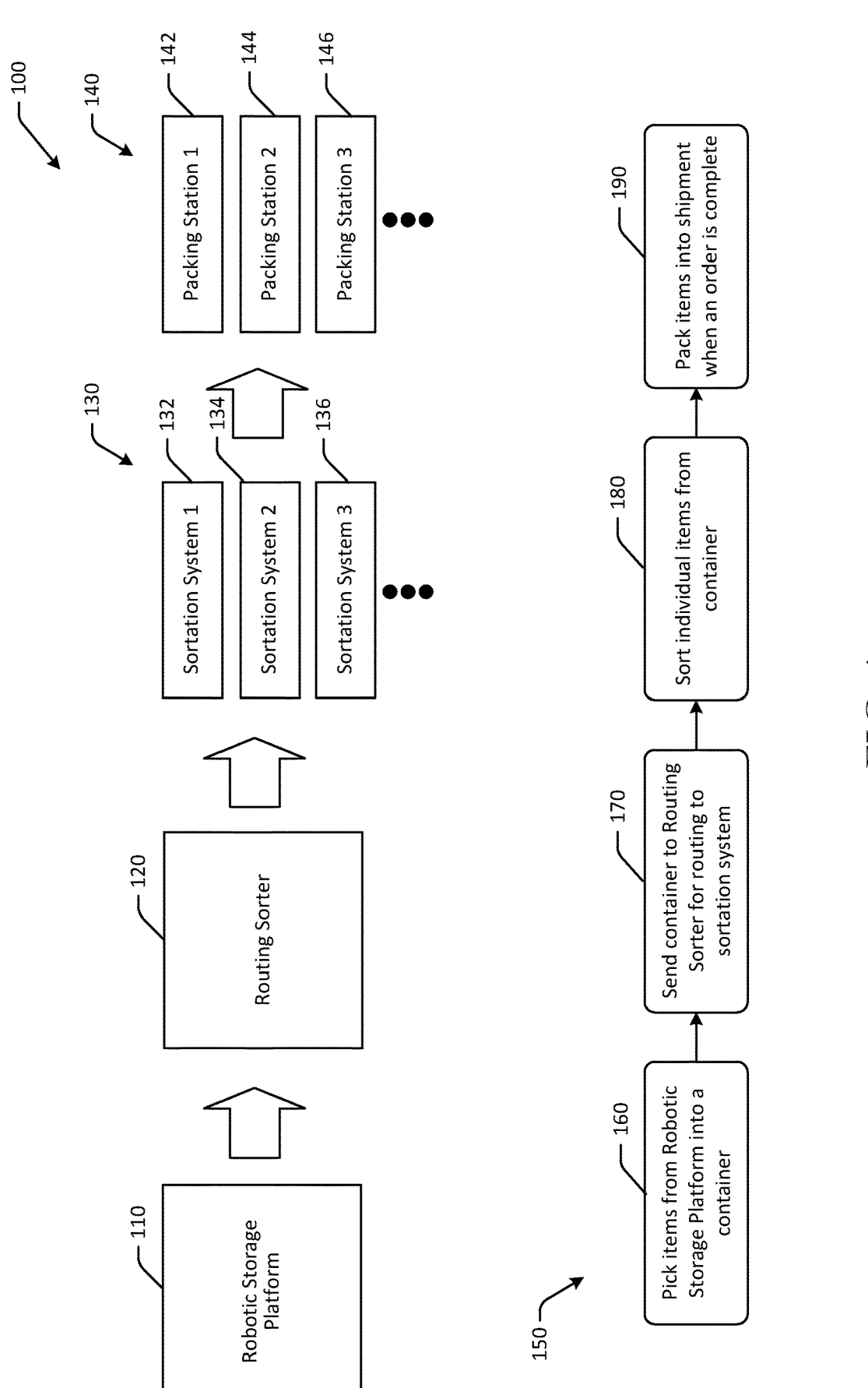
FIG. 1 is a hybrid schematic illustration of an example use case for creating walkways in heavy machinery and equipment and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

Machines, such as sortation systems, robots, and other machinery, may be used for various functions in a facility, such as sortation, movement or transport of containers or items, and so forth. Some machines may be very large and heavy, such as over 30 feet tall and weighing several tons. Depending on the design of a machine, access to internal components of a machine may be difficult, which may make maintenance and repairs of machines difficult and time consuming. For example, some sortation systems may have containers on both sides, where items or packages can be sorted into containers on either side of an aisle by robots moving in the aisle. Access to the aisle may be difficult as access may be restricted. In some cases, maintenance for some machines may necessitate taking the machine out of service and disassembling large portions of the machine. Such projects may be further complicated due to the scale and size of some machines.

In the case of sortation systems, some sortation systems may be highly automated and complex in the sense that several different automated machines may be used for sortation of items. For example, a sortation system may be formed of several individual subsystems or modules that are interdependent and interconnected for their overall functionality. These modules may be physically connected to each other or in close proximity to each other. However, this also presents a highly challenging situation for accessibility to various parts of the machine for maintenance, trouble shooting, etc.

Embodiments of the disclosure provide systems and methods to create walkways in heavy machinery and equipment, such as sortation systems. The systems and methods described herein may facilitate automated separation of modules or subsystems of a machine, so as to enable easy access to internal components of machines for maintenance, repair, and so forth. Some embodiments may allow for partial shutdown of machine operation, thereby reducing downtime and reducing impact on machine throughput. Some embodiments include an automated container matrix actuation system that allows for repositioning of a container matrix over a shuttle rail portion of the sortation system, thereby allowing for creation of walkways without increasing an overall machine footprint, so as to avoid the need for additional floor space requirements around the machinery or equipment. Some embodiments may include fully automated processes and corresponding actuation systems that allow for access to particular portions of the machine without impacting operation of other portions. The modules or subsystems of the machine can be moved to provide access, and then quickly reassembled after maintenance, inspection, troubleshooting, or repairs are completed. Some embodiments may be configured to separate modules that are freestanding and/or adjacent to static modules of a machine.

Referring to FIG. 1, an example use case 100 for creating walkways in heavy machinery and equipment and an example process flow in accordance with one or more embodiments of the disclosure. Although discussed in the context of online orders, other embodiments may be directed to any suitable use case where items, such as products, packages, or other items, are picked and/or sorted, such as instances where users may pick up orders rather than receiving a shipment.

In FIG. 1, a fulfillment center may include a robotic storage platform 110, a routing sorter 120, one or more sortation systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual operators or a combination thereof may be used to pick products. The picking process at the robotic storage platform may include locating a product in an order, obtaining the product, and sending the product to the robotic storage platform 110, such as via a conveyor belt (e.g., smooth belt, cleated belt, etc.). In the illustrated embodiment, products at the robotic storage platform 110 may be placed in a container, such as a tote.

At the routing sorter 120, totes including products that have been picked may be routed to an appropriate or designated sortation system. For example, the routing sorter 120 may determine an identifier associated with the tote, and may determine the sortation system associated with the tote using the identifier. The routing sorter 120 may route or direct the tote to the appropriate sortation system.

The sortation systems 130 may include one or more sortation system machines. In FIG. 1, a first sortation system 132, a second sortation system 134, a third sortation system 136, and so forth may be included. Any number of sortation systems may be included. Some or all of the sortation systems may be associated with certain totes, certain functions, certain geographic regions, and so forth. The sortation systems may be used to consolidate or otherwise aggregate products for single or multi-item orders. For example, a first tote may include a first item of a multi-item order, and a second tote may include a second item of the multi-item order. The sortation system may therefore identify the orders associated with the respective products in a tote, and may transport the products to a container, such as a bin, associated with the order. When the order is complete with all of the products in the associated bin, the order may be packed. Accordingly, a specific sortation system may be designated for fulfillment of a particular order. At the sortation systems 130, totes that are received via the routing sorter 120 may be emptied, and the products in the respective totes may be transported to the appropriate bins for the orders for which the products were picked.

After a single or multi-item order is complete (e.g., the sortation system has delivered all of the products in the order to the appropriate bin, etc.), the order may be packed at the packing station 140. In some embodiments, one or more packing stations may be included. In some instances, a packing station may service more than one sortation system, while in other instances, more than one packing station may service one sortation system. In the illustration of FIG. 1, a first packing station 142 may be used to pack orders from the first sortation system 132, a second packing station 144 may be used to pack orders from the second sortation system 134, a third packing station 146 may be used to pack orders from the third sortation system 136, and so forth. At the packing stations 140, the orders may be placed into boxes and sealed for subsequent shipment. The packages may then be processed for shipment to the user. In other instances, the sortation systems 130 may be used to sort packages designated for different geographic regions, and may therefore output packages to different loading docks, etc. The sortation systems 130 may be used for additional sortation purposes.

At the fulfillment center, an example process flow 150 illustrated in FIG. 1 may be implemented to improve the efficiency and/or throughput of the fulfillment center. At a first block 160, items may be picked from the robotic storage platform 110 into a container, such as a tote. At a second block 170, the tote may be sent to the routing sorter 120 for routing to a sortation system. At a third block 180, the items from the tote may be sorted from the container by the sortation system. At a fourth block 190, the items may be packed into a shipment when all of the items in the order are sorted or when an order is complete.

The systems and methods for creating walkways in heavy machinery and equipment as described herein may be used with any of the equipment described with respect to FIG. 1. For example, the sortation systems may be heavy machinery with a number of modules or machines. The systems described herein may be used to separate the modules and provide access for easy repairs, maintenance, inspection, and so forth.

Figure 2:
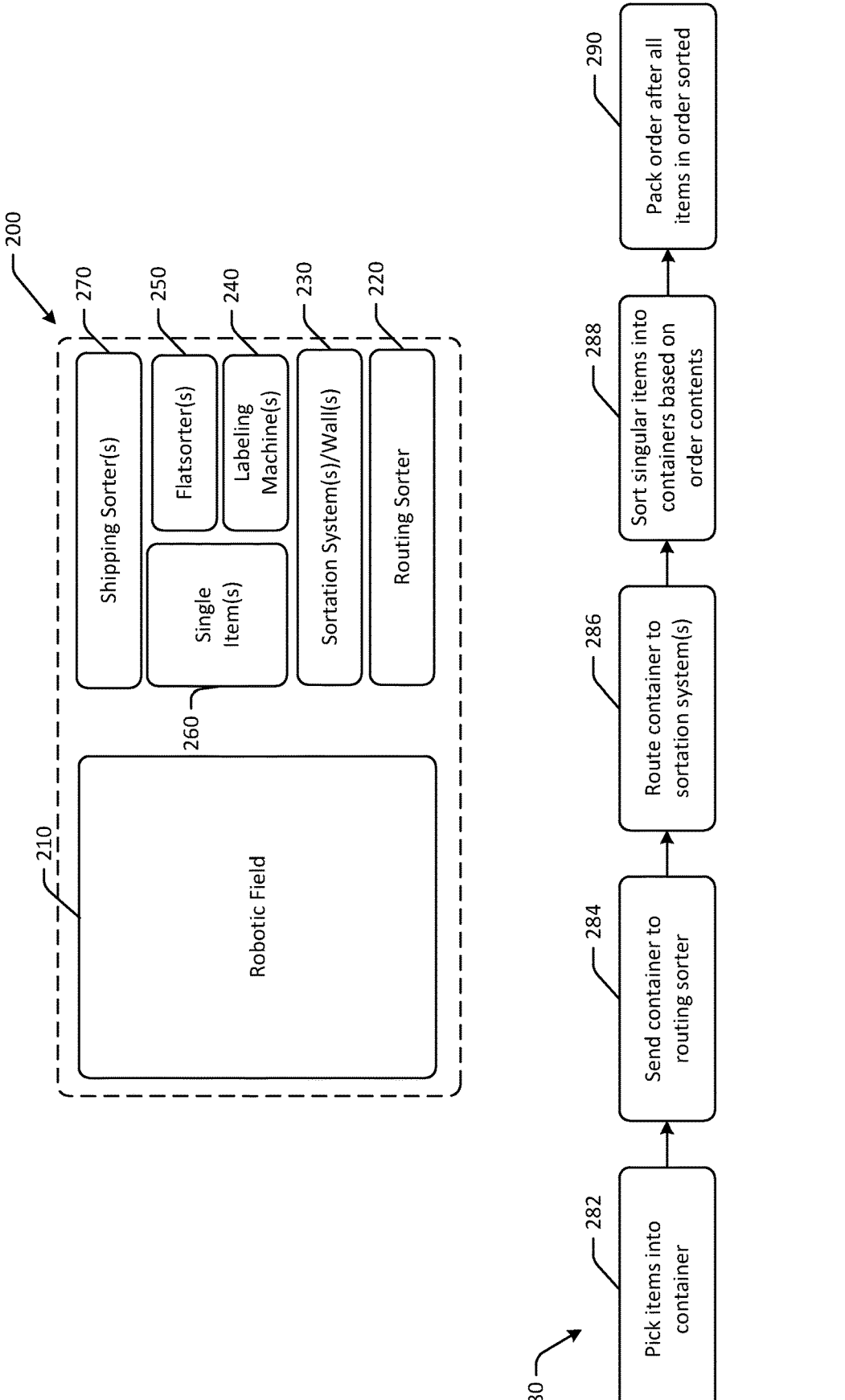
FIG. 2 is a hybrid schematic illustration of an example use case for creating walkways in heavy machinery and equipment and an example process flow in accordance with one or more embodiments of the disclosure.

FIG. 2 is a hybrid schematic illustration of an example use case for creating walkways in heavy machinery and equipment and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to route containers or other items to certain sortation systems, one or more sortation systems or walls 230 that may be used to sort single or multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

The fulfillment center 200 may implement a process flow 280 for processing single or multi-item orders. At a first block 282, items for different orders may be picked into a tote or container that may be sent to a sorting machine, such as one of the sortation systems 230. The tote may include items from any order that is being consolidated by the specific sortation system machine. The sortation system may sort singular items into single or multi-item orders. At a second block 284, the tote may be sent to a routing sorter. At a third block 286, the routing sorter may route or divert the tote to any sortation or an assigned sortation system (e.g., the sortation system that is consolidating items for a particular order for multi-order instances, etc.). At a fourth block 288, the sortation system may sort singular items from the tote or container into a different tote or container based on the order contents. For example, the containers at the sortation system may be assigned to a particular order that may be single or multi-item. At a fifth block 290, the order may be packed after all items in the order are sorted.

The sortation system machines 220 may include bins or containers of different sizes (e.g., small, medium, large, etc.) and may be configured, in one example, to handle items that weigh up to twenty or more pounds. The totes (or other containers) may be stored at angles, such as inclined angles, that may help avoid buildup of items on a particular side of the tote. In some embodiments, the sortation system machines 220 may include multiple chutes, and may be configured to sort items at a rate of about 3,600 units per hour. In some instances, the sortation system machines 220 may have two inductors (e.g., one on each side, etc.) for inducting items from containers, and may be modular.

In some embodiments, the sortation system machines 220 may replace other processes, such as manual processes. For example, manual induction of products from a tote to a sorter machine may be a bottleneck that is avoided by the systems and methods described herein. The sortation system 230 may include cross-belt shuttles that sort singulated products into containers or totes. Sortation systems 230 may be capable of sorting at a rate of 3,500 units per hour. Certain sortation system machines 230 may be configured to handle items of up to twenty pounds, or more in some instances (e.g., 100 pounds or more), with dimensions of about 18"×14"×8" or 28"×14"×9", which may cover almost all products at the fulfillment center 200. The sortation system 230 may operate as a high-speed, high-destination sort solution that intakes items or packages and sorts them into containers using a shuttle that travels vertically and horizontally inside the machine (or outside in some instances).

Individual sortation systems may be sortation systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with single or multi-item orders. The tote from which items are inducted may be associated with the individual sortation system machine (e.g., the modular sorting machines that form the individual sortation system machine, etc.).

Accordingly, sortation systems may be arranged in rows and may receive assigned totes from a routing sorter, thereby streamlining fulfillment center operation and reducing labor and space costs. The sortation systems may process totes for multi-order sortation and consolidation. As a result, there may no longer be a need to singulate and send items to a wall for manual extraction, because each tote may be assigned to a particular sortation system machine. Induct stations can be replaced with sortation system machines.

In another embodiment, pickers may pick items directly to a segmented belt conveyor at a station that is near a sortation system machine. Other nearby pick stations may also pick items directly to conveyance for the same sortation system machine. Picked items being transported to a single sortation system machine may merge together to be inducted into their unique sortation system machine, where multi-item orders may be consolidated and sent to packing.

Embodiments of the disclosure include creating walkways in heavy machinery and equipment. Certain embodiments may improve processing speed and/or throughput of fulfillment centers. Certain embodiments may improve performance of mechanical equipment for sortation and/or consolidation of items for single or multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
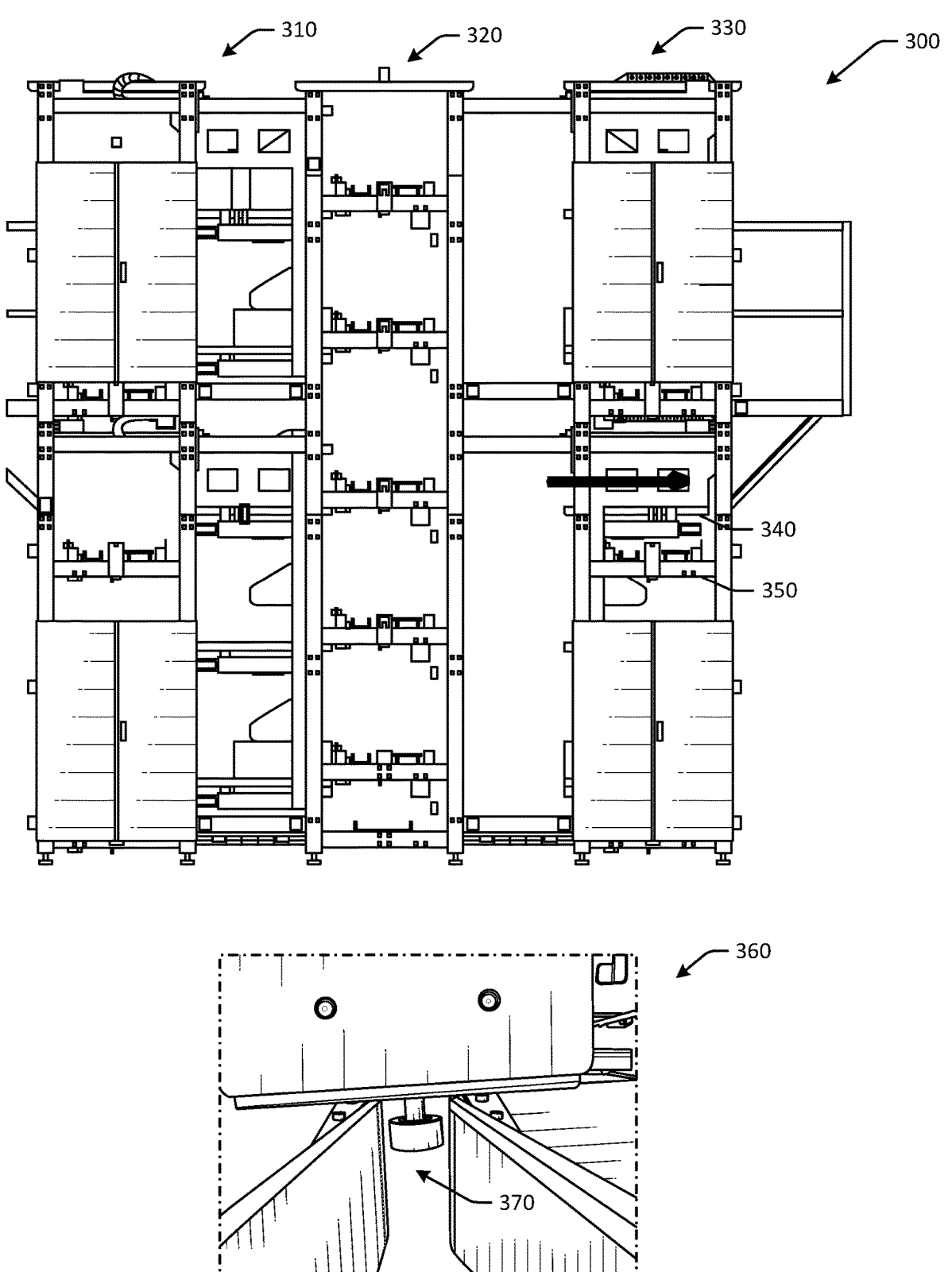
FIG. 3 is a schematic illustration of a sortation system that may have a system for creating walkways therein in accordance with one or more embodiments of the disclosure.

FIG. 3 is a schematic illustration of a sortation system that may have a system for creating walkways therein in accordance with one or more embodiments of the disclosure. Other embodiments may include additional or fewer components. The illustration of FIG. 3 is not to scale, and may not be illustrated to scale with respect to other figures. The sortation system illustrated in FIG. 3 may be the same sortation system discussed with respect to FIGS. 1-2.

In FIG. 3, the sortation system 300 may include one or more modules or components. For example, the sortation system 300 may include a first shuttle track path 310 and a first tote rack or container matrix 320. Shuttles may move along the first shuttle track path 310 to deliver items to containers in the first container matrix 320. The sortation system 300 may include a central spine or an aisle 330 that separates the first shuttle track path 310 and the first container matrix 320 from a second container matrix 340 and a second shuttle track path 350. Shuttles may move along the second shuttle track path 350 to deliver items to containers disposed in the second container matrix 340. The sortation system 300 may include a number of elevators to change shuttle or tote elevations, along with an induction portion. The sortation system 300 may include a main control panel. The sortation system 300 may include a number or shuttles or mobile carrier units configured to move along the aisle 330 and/or the various shuttle paths. Shuttle paths may be on different levels of the sortation system 300, and may therefore be disposed at an upper, middle, or lower portion of the sortation system 300. Other components may be included. Different embodiments may include additional or fewer components.

The first container matrix 320 and the second container matrix 340 may each be a modular rack system that includes one or more vertically spaced or horizontally spaced levels, where some or all of the levels may include container slots. The first container matrix 320 and the second container matrix 340 may house containers, such as totes, bins, bags, or other containers, that can be used to hold sorted items, such as items that correspond to certain orders. The containers may be stored at one or more different angles. The first container matrix 320 and the second container matrix 340 may include an array of containers with removable and/or rearrange-able container configurations. The containers may be of the same or different dimensions. The first container matrix 320 and the second container matrix 340 may include one or more levels, such as a first level and a second level. The first level may include a first plurality of container slots configured to receive individual containers, and the second level may include a second plurality of container slots configured to receive individual containers. The first level may be an upper level or lower level with respect to the second level.

The induction portion may be an induction point for items, such as products or packages, that are input at the sortation system 300 for sortation. The sortation system 300 may include an outbound portion where containers that are full, or that include all of the items in an order, may be directed after completion of sortation. For example, containers that are ready to move to a different stage or portion of a fulfillment center may be retrieved from the respective container matrix by one or more of the mobile carrier units and delivered to the outbound portion of the sortation system 300.

The sortation system 300 may include an empty container intake portion where empty containers are input to the sortation system 300. For example, as full or completed containers are removed from container slots at the first container matrix 320 and the second container matrix 340, the container slots may be filled with empty containers. For example, one or more mobile carrier units may retrieve an empty container from the empty container intake portion and deliver the empty container to an empty container slot. In some embodiments, the mobile carrier unit may retrieve an empty container after delivering a completed container, such as by moving backwards or forwards along a track.

The sortation system 300 may include one or more tracks, such as the shuttle track paths. The tracks may be used by the mobile carrier units to move between the respective portions of the sortation system 300. For example, the mobile carrier units may move along a certain track or set of tracks to reach a first container, and along a different set of tracks to reach a second container. Tracks may lead to different levels of the first container matrix 320 and the second container matrix 340.

The mobile carrier units may individually include one or more conveyor belts, such as cross-belt conveyors or other mechanical components, and may be configured to move along the respective tracks of the sortation system 300. The mobile carrier units may be configured to perform various functions, such as retrieving items, depositing items into containers on the different levels of the first container matrix 320 and the second container matrix 340, retrieving full containers from container slots, depositing empty containers into container slots, and other functions. The mobile carrier units may be controlled by one or more computer systems or controllers. The mobile carrier units may include at least two sidewalls on opposite sides of the mobile carrier unit. The sidewalls may be used to secure a payload. Some embodiments may not include sidewalls. Some embodiments may include one or more doors that can be opened or closed. For example, the mobile carrier unit may include a first door disposed transverse to the at least two sidewalls, where the mobile carrier unit is configured to automatically open and/or close the first door. In some instances, the first door, when in an open position, may form a chute that can be angled towards a container on a lower level. In some instances, the mobile carrier unit may include a second door disposed opposite the first door, where the mobile carrier unit is configured to automatically open and/or close the second door. Mobile carrier units that include multiple sidewalls and/or doors that serve as sidewalls may be used to secure various types of payloads, such as round balls or objects that may remain contained within the sidewalls during movement.

The sortation system 300 may be separated into distinct modules. During operation, the modules of the sortation system 300 may be disposed adjacent to each other, and the sortation system 300 may be arranged in an operational configuration, such as that depicted in the view of FIG. 3. However, if maintenance or repairs are needed for various portions of the sortation system 300, such as repairs in the aisle 330, access to the components may be difficult.

Accordingly, the sortation system 300 may be configured such that individual modules of the sortation system 300 may be separated and removed from the remainder of the sortation system 300, so as to provide easy and safe access to the aisle 330 or other portions of the machine needing access.

For example, to access the aisle 330 adjacent to the second container matrix 340, an actuation system may be used to actuate the second container matrix 340 to position the second container matrix 340 into the space adjacent to (e.g., above or below, etc.) the second shuttle track path 350, as depicted by the arrow in the illustration of FIG. 3. Some or all of the second container matrix 340 may be repositioned temporarily adjacent to the second shuttle track path 350, such that the container matrix and the shuttle track path are vertically aligned. Shuttles may be prevented from moving along the shuttle track path while the second container matrix is out of position. While the second container matrix 340 is out of position, the adjacent portion of the aisle 330 is accessible.

As depicted in detail view 360, the sortation system 300 may include one or more guide rails or channels 370 that guides actuation of the second container matrix 340 towards and away from the second shuttle track path 350. Any number of actuation systems may be included, and may be used to actuate discrete portions of the first container matrix 320, the second container matrix 340, and so forth. In addition, actuation systems may be configured to actuation individual levels of the container matrices, such as a first level, a second level, a third level, etc.

The sortation system 300 may therefore include a first module at which items are inducted into the item sortation system, and a second module coupled to the first module, where the second module has a first track for item shuttles and a second track for item shuttles. The first track may be disposed along a lower portion of the item sortation system and the second track may be disposed along an upper portion of the item sortation system. The sortation system 300 may include a third module coupled to the first module and the second module, where the third module includes a container matrix configured to support a first set of containers disposed along the lower portion of the item sortation system and a second set of containers disposed along the upper portion of the item sortation system. The sortation system 300 may include a first actuation system configured to actuate the first set of containers from a first position to a second position, where the lower portion of the item sortation system is unoperational or operation is otherwise paused when the first set of containers is in the second position, and where the first set of containers is vertically aligned with the first track in the second position. The sortation system 300 may include a controller configured to control the first actuation system. In other embodiments, the first module may be a module at which items are inducted into an item sortation system, the second module may include one or more tracks for item shuttles, and the third module may include a container matrix.

The modules may be coupled to the sortation system 300 via various mechanisms, such as a quick connect coupling mechanism. Quick connect coupling mechanisms may include latches, pins, and other systems. Such mechanisms may allow for rapid coupling and decoupling of modules, and may also provide visual feedback indicating whether or not a module is securely in place.

Figure 4:
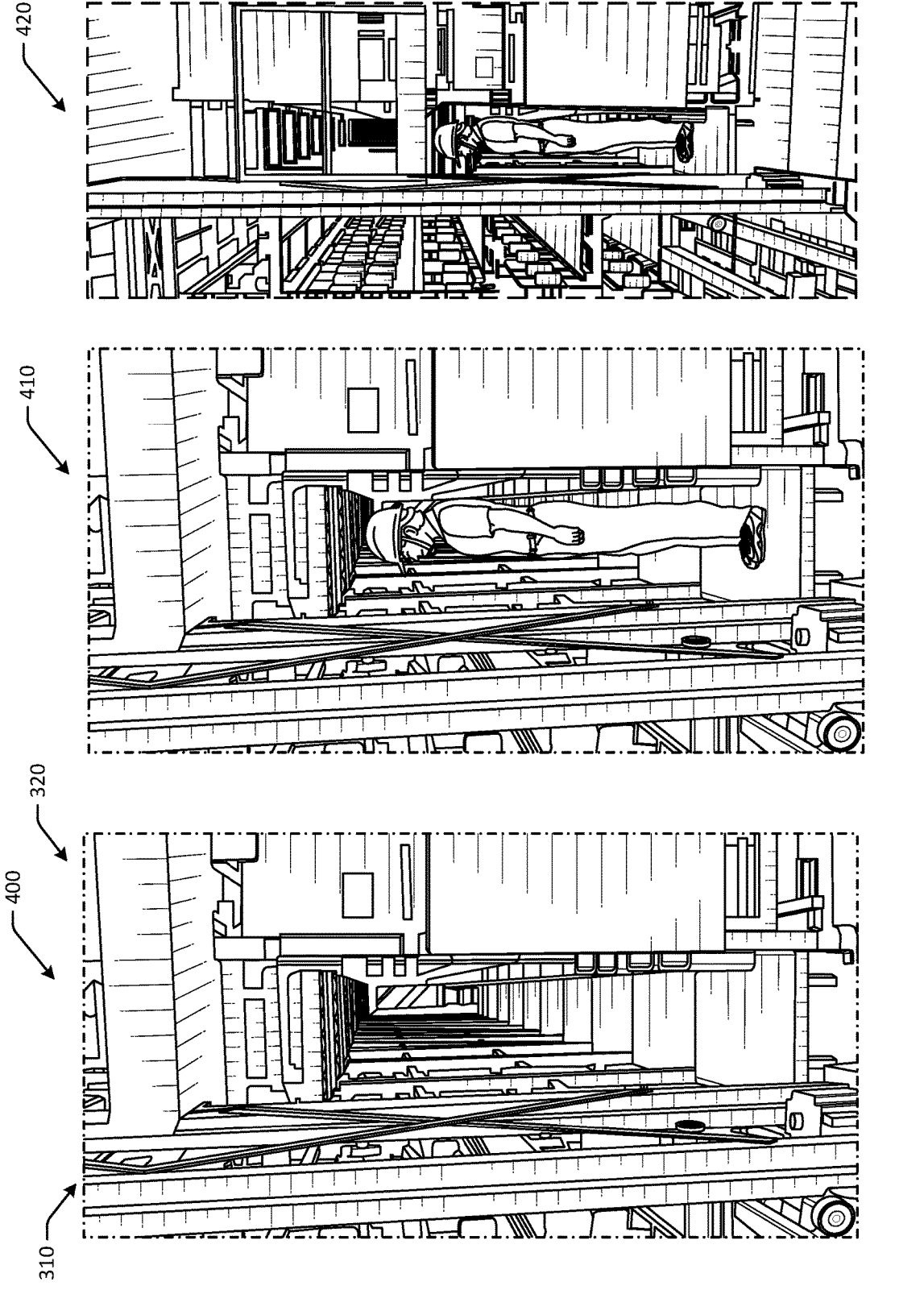
FIG. 4 is a schematic illustration of various spaces between separated components of the sortation system of FIG. 3 when the sortation system is in an actuated configuration in accordance with one or more embodiments of the disclosure.

FIG. 4 is a schematic illustration of various space between separated portions of the sortation system of FIG. 3 when the sortation system is in an actuated configuration in accordance with one or more embodiments of the disclosure. Other embodiments may include additional or fewer components. The illustration of FIG. 4 is not to scale, and may not be illustrated to scale with respect to other figures. The sortation system illustrated in FIG. 4 may be the same sortation system discussed with respect to FIGS. 1-3.

In a first example 400 of FIG. 4, the second container matrix 340 may be actuated towards the second shuttle track path 350, so as to create a walkway adjacent to the aisle 330. After the second container matrix 340 is moved, the sortation system 300 may be in an actuated configuration, but may have the same footprint as the actuation may take place internally and may not affect the external dimensions of the sortation system. In the actuated configuration, there may be additional space in the aisle 330 between the first container matrix 320 and the second container matrix 340. For example, as depicted in FIG. 4, an operator may walk freely in the space created via movement of the second container matrix 340. Other equipment, such as forklifts, may be positioned in the space created via movement of the second container matrix 340. In a second example 410, portions of the sortation system may be actuated so as to create a walkway for an operator along a middle or upper level catwalk of the sortation system. In a third example 420, portions of the sortation system may be actuated so as to create a walkway for an operator along a lower level catwalk of the sortation system. With the different walkways, operators may quickly gain access to different internal portions of the system without requiring additional external space.

Figure 5A:
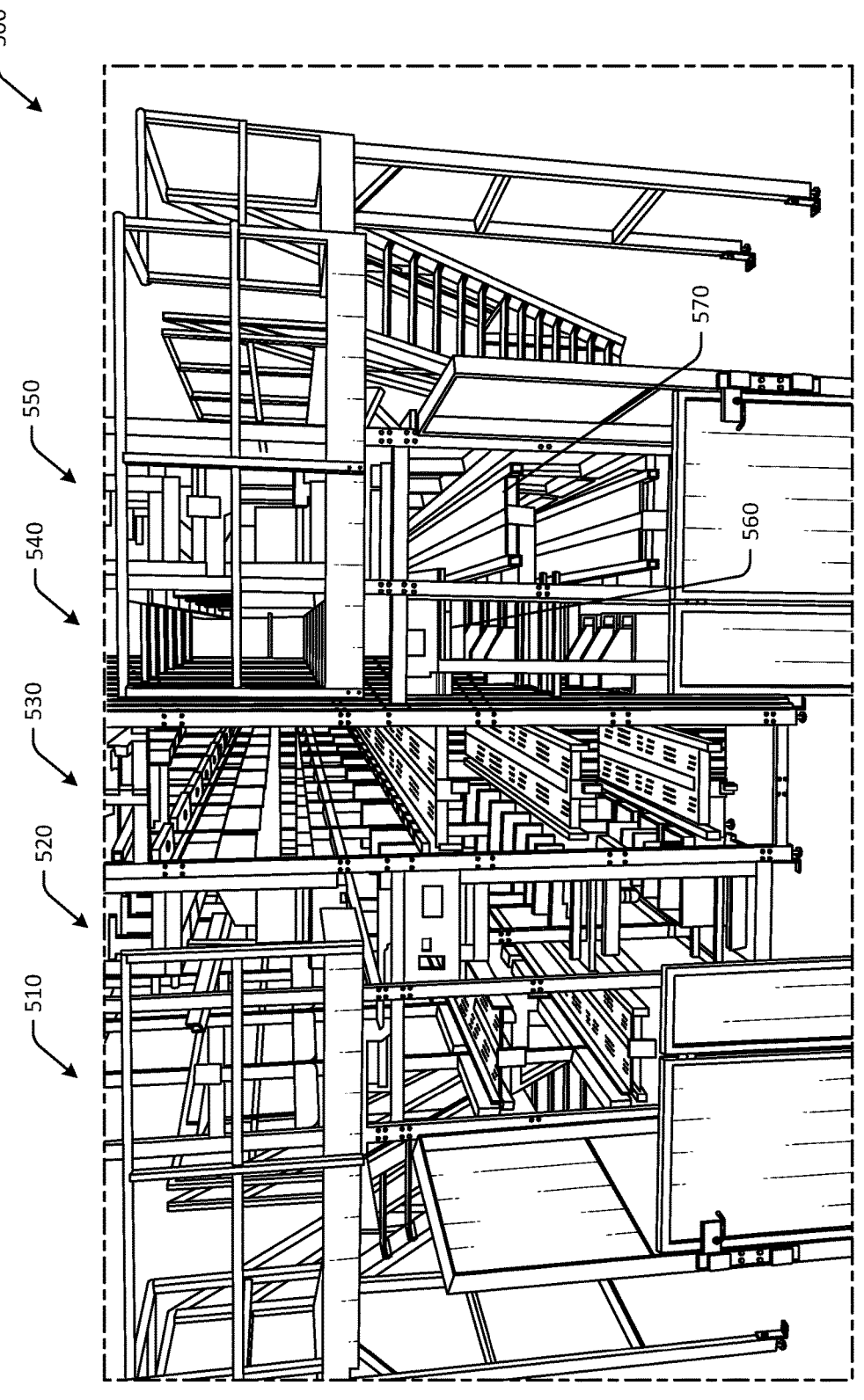
FIGS. 5A-5C are schematic illustrations of a system for creating walkways in heavy equipment in various stages of movement in accordance with one or more embodiments of the disclosure.
Figure 5B:
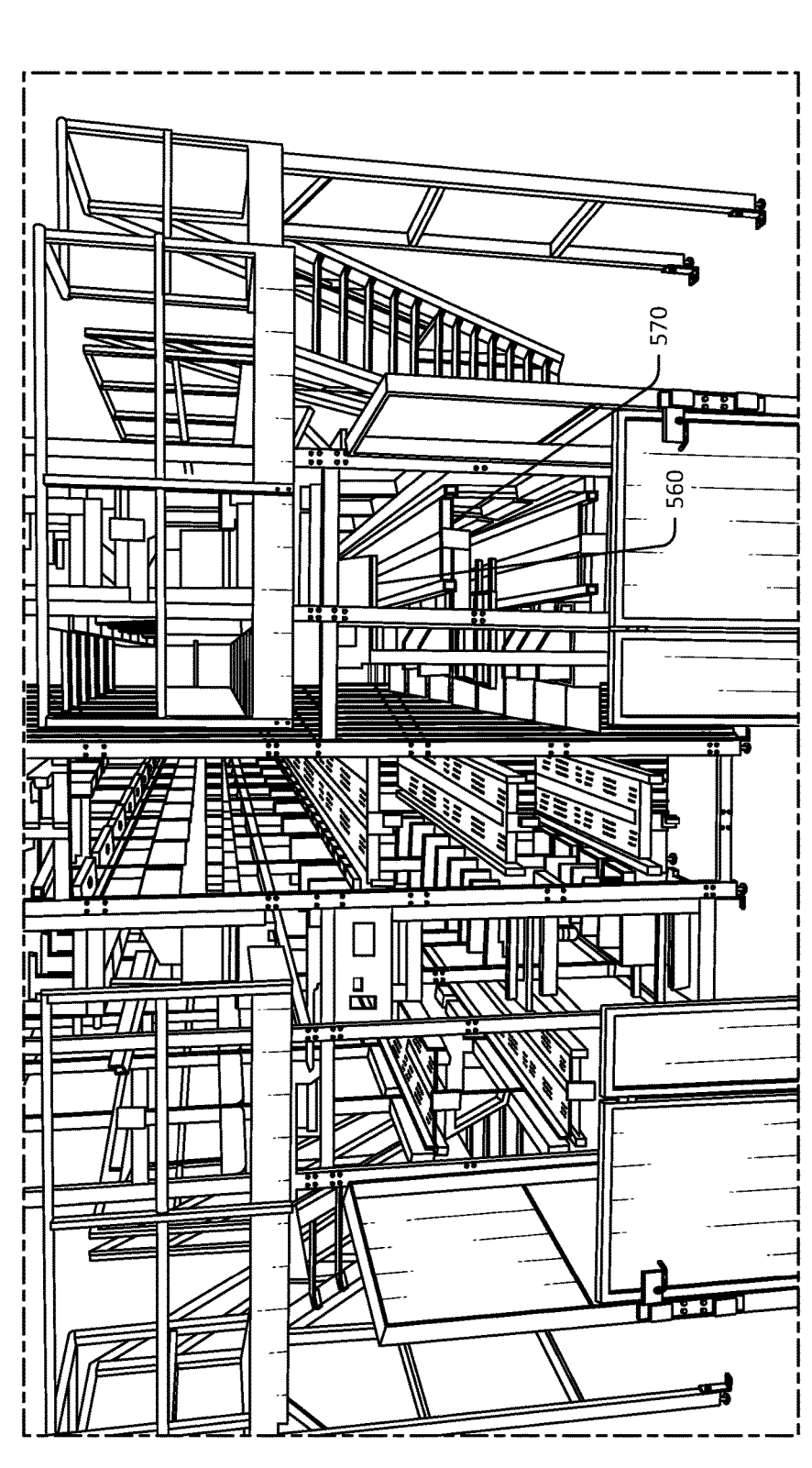
Figure 5C:
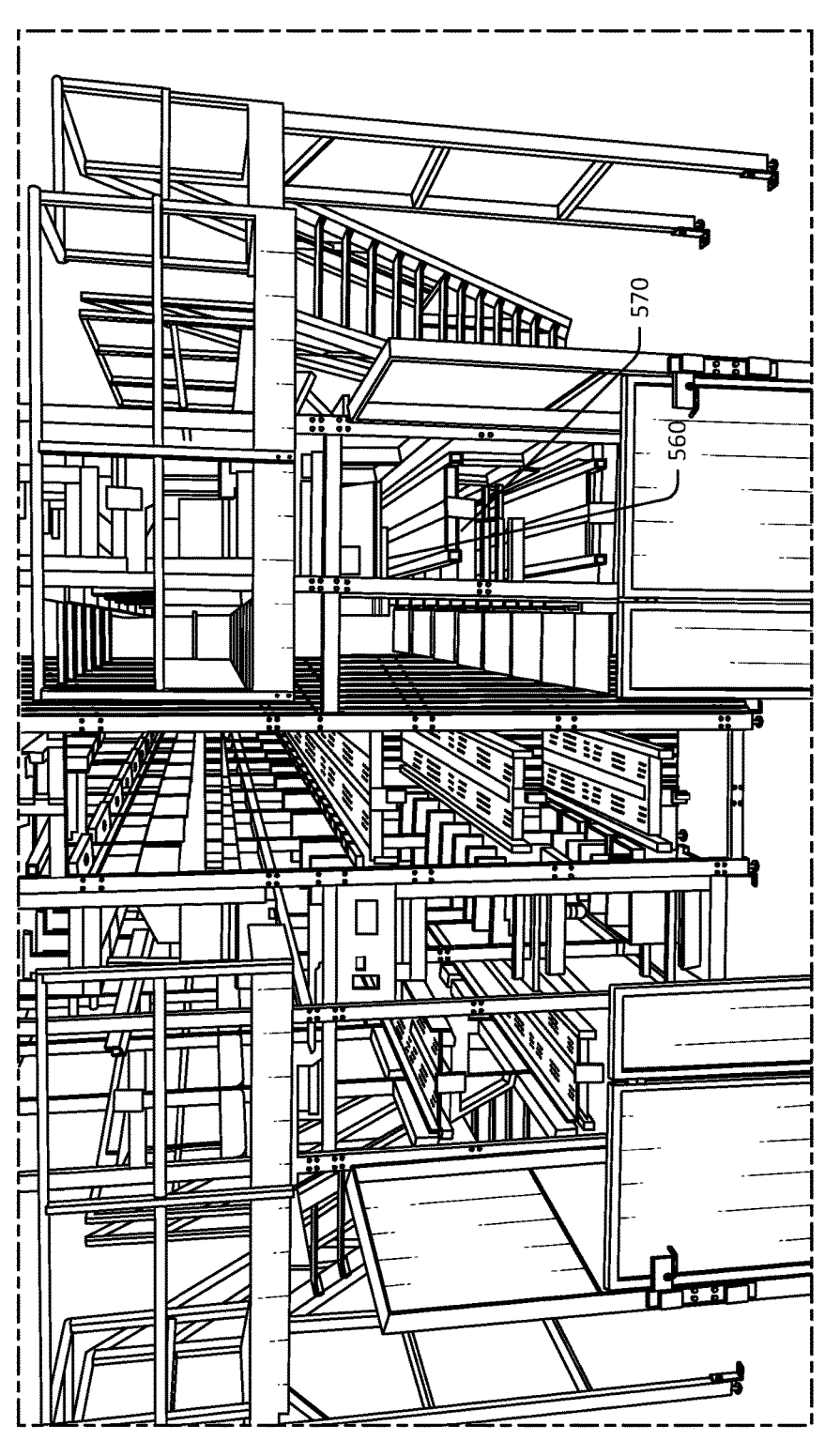

FIGS. 5A-5C are schematic illustrations of a system for creating walkways in heavy equipment in various stages of movement in accordance with one or more embodiments of the disclosure. Other embodiments may include additional or fewer components. The illustration of FIGS. 5A-5C may not be to scale, and may not be illustrated to scale with respect to other figures. The sortation systems illustrated in FIGS. 5A-5C may be the same sortation system discussed with respect to FIGS. 1-4.

In FIGS. 5A-5C, a sortation system 500 is depicted in various stages of container matrix actuation. The sortation system 500 may include a first shuttle track path 510, a first container matrix 520, a central spine or aisle 530, a second container matrix 540, and a second shuttle track path 550. The first container matrix 520, the second container matrix 540, the first shuttle track path 510, and the second shuttle track path 550 may have one or more levels. Individual portions of the respective container matrices, which may include individual levels and/or one or more lateral portions (e.g., actuation systems may be positioned every 2 vertical columns so as to provide more granular control over actuation, etc.) of the container matrices to avoid impact to machine throughput. Other embodiments may be used with different types of heavy machinery.

To create a walkway in the sortation system 500, one or more actuation systems may be used to actuate a portion of the respective first container matrix 520 and/or the second container matrix 540 towards the respective shuttle track path, such that the containers block the shuttle track path, but a walkway is created for accessibility.

In a first position depicted in FIG. 5A, a first portion 560 of the second container matrix 550 may be in a default position. In FIG. 5B, a second position 580 is depicted, where the first portion 560 of the second container matrix 550 is actuated towards a corresponding portion 570 of the second shuttle track path 550 so as to create a walkway in the sortation system 500. In FIG. 5C, the first portion 560 of the second container matrix 550 is in a fully actuated position 590 towards the corresponding portion 570 of the second shuttle track path 550. In the fully actuated position 590, a portion of the sortation system 500 may be disabled and/or operation may be paused. The remainder of the sortation system 500 may continue normal operation.

The sortation system 500 may therefore include a first module, such as an induction module at which items are inducted into the sortation system. The sortation system 500 may include a second module coupled to the first module, where the second module comprises a first track and a second track, such as the first shuttle track path 510 and the second shuttle track path 550. The first track and the second track may be tracks for item shuttles. The first track may be disposed along the lower portion of the system and the second track may be disposed along the upper portion of the system. The sortation system 500 may include a third module coupled to the first module and the second module, where the third module has a container matrix configured to support a first set of containers disposed along a lower portion of the system and a second set of containers disposed along an upper portion of the system. The third module, which may be the first container matrix or the second matrix, may include a frame having a fixed position, such that only a portion of the container matrix is actuated.

The sortation system 500 may include a first actuation system configured to actuate the first set of containers or another portion of the container matrix from a first position to a second position, where the first set of containers is substantially vertically aligned with the first track in the second position. Depending on the location of the actuation, the upper portion, middle portion, or lower portion of the system may be disabled or unoperational when the first set of containers is in the second position due to the first set of containers blocking the first track. A footprint of the sortation system 500 is constant when the first set of containers is in the first position and in the second position.

The sortation system 500 may include a second actuation system configured to actuate the second set of containers from a first position to a second position, where the upper portion of the system may be unoperational when the second set of containers is in the second position, and where the second set of containers is substantially vertically aligned with the second track in the second position. Actuation of the first actuation system provides access to a different internal portion of the system than actuation of the second actuation system. Accordingly, some embodiments may allow for individual actuation depending on the desired location of access. The second actuation system may be separated from the first actuation system by at least two vertical columns of the sortation system 500.

The sortation system 500 may include a controller configured to determine a section of the system for which to provide access corresponds to the first actuation system, and depending on the selected section, the controller may cause the first actuation system to be actuated. Some embodiments may include a sensor configured to indicate that the third module is positioned in the default position or to otherwise positively determine positioning. Some embodiments may include a set of guide rails disposed between the second module and the third module, where one or more portions of the set of guide rails are removable, so as to provide a clear path between the second module and the third module.

Figure 6:
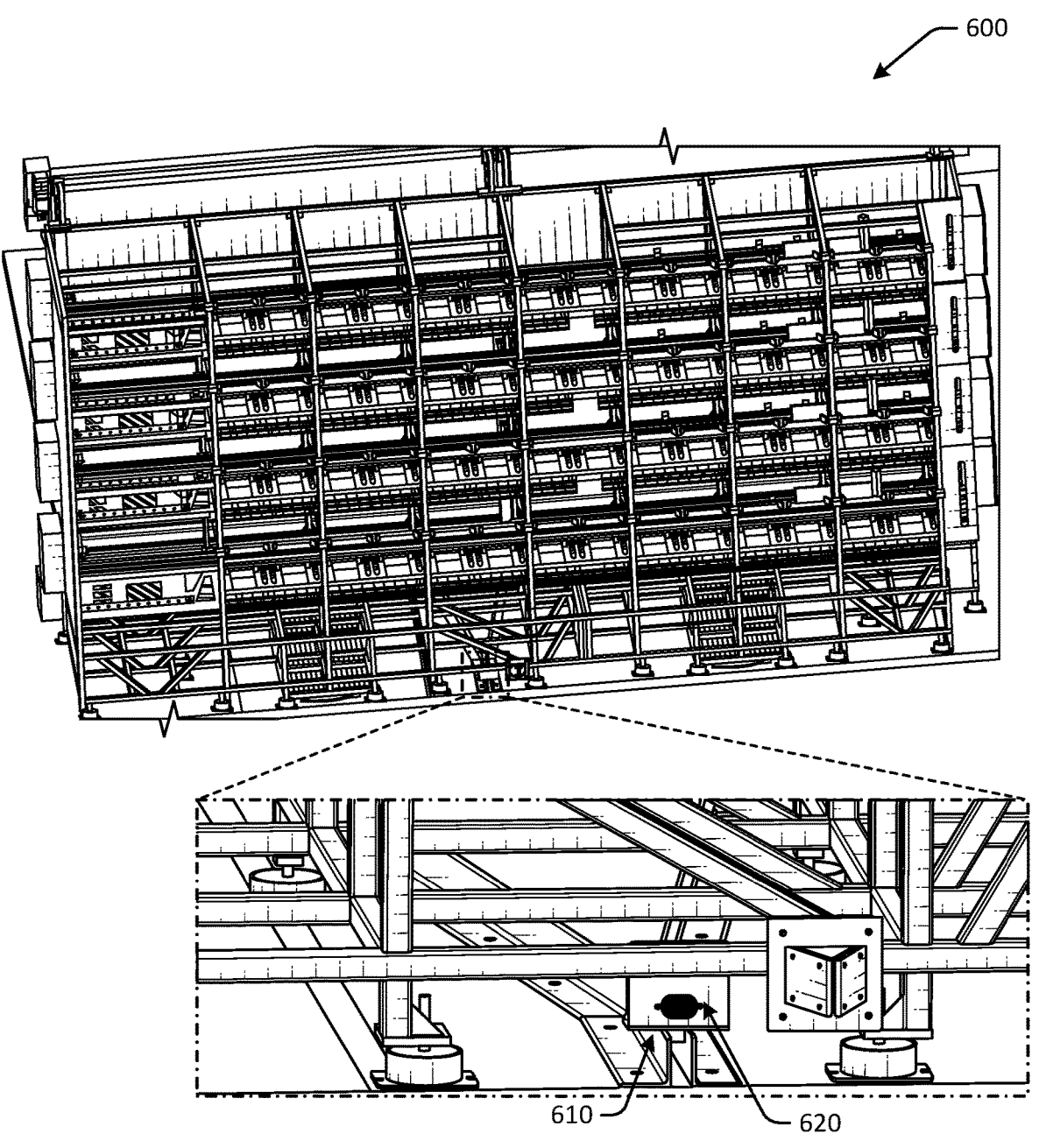
FIG. 6 is a schematic illustration of guide rails used to guide movement of machine modules in accordance with one or more embodiments of the disclosure.

FIG. 6 is a schematic illustration of guide rails used to guide movement of machine modules in accordance with one or more embodiments of the disclosure. Other embodiments may include additional or fewer components. The illustration of FIG. 6 is not to scale, and may not be illustrated to scale with respect to other figures. The sortation system illustrated in FIG. 6 may be the same sortation system discussed with respect to FIGS. 1-5C.

In FIG. 6, a module 600 of a sortation system may be a container matrix or a tote rack. To ensure straight and aligned movement of the module 600, instead of using support rollers, embodiments may use a combination of guide rails 610 and a sensor 620. The sensor 620 may be configured to indicate that a certain portion of the system or a certain module is positioned in a default position. This may provide positive positioning feedback and allow for rapid realignment of the module when actuating the container matrixes towards or away from the shuttle track paths. The guide rails 610 may be completely removable to provide a floor surface that is free of obstacles, thereby allowing forklifts and other equipment to be moved behind the module 600. The guide rails 610 may be a set of guide rails coupled to the sortation system, where one or more modules are configured to slide along the set of guide rails. In some instances, the module may be slide or otherwise moved after the upward force is applied to the module. One or more portions of the set of guide rails may be removable, so as to provide a clear path between the moved module and the sortation system or other equipment.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
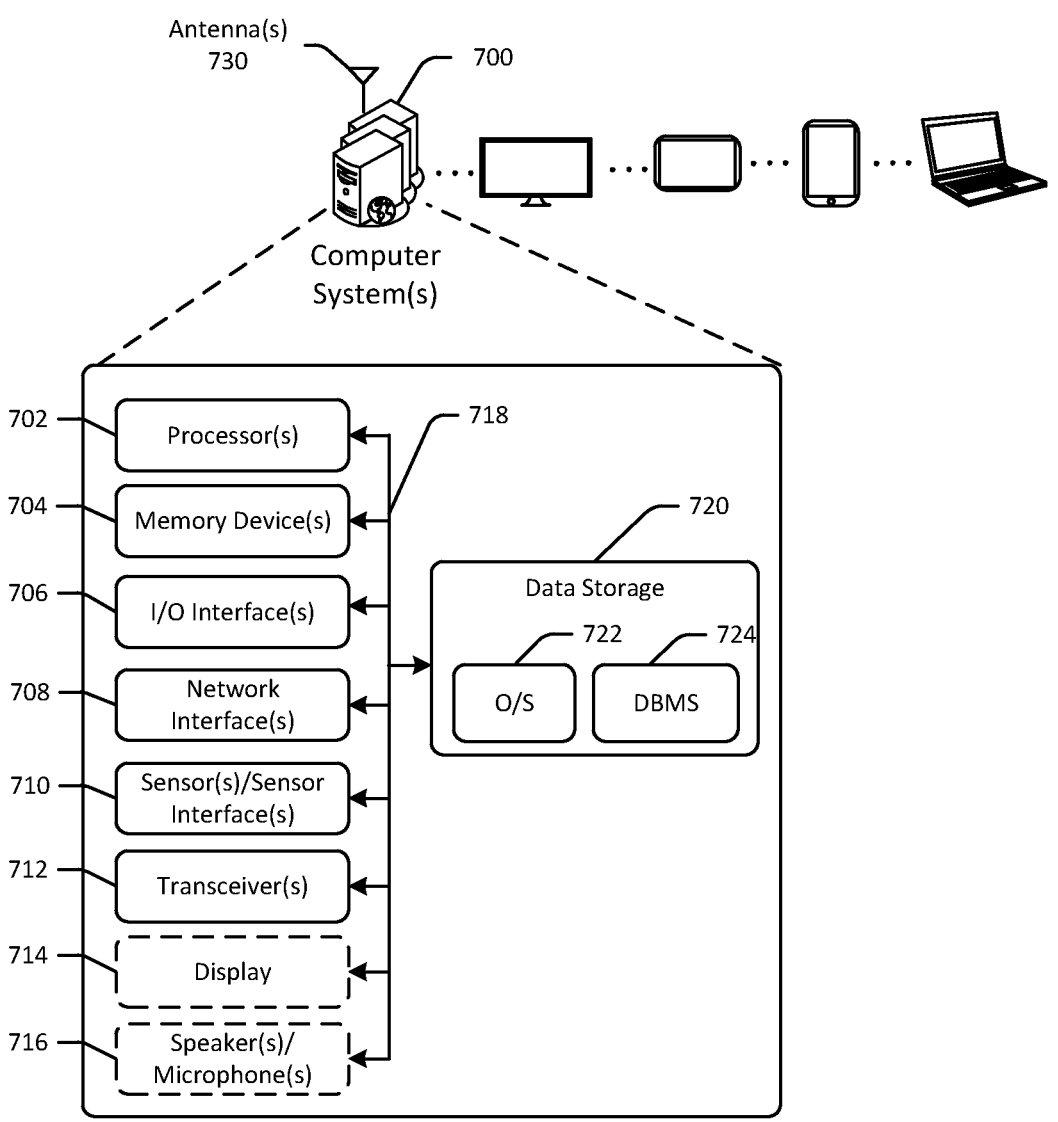
FIG. 7 schematically illustrates an example architecture of a computer system associated with a sortation system in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the controller(s) or computer system(s) of FIGS. 1-6.

The computer system(s) 700 may be configured to communicate with one or more servers, user devices, or the like. The computer system(s) 700 may be configured to control mobile carrier unit, sortation system components, and/or automated actuation systems.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An item sortation system comprising:
a first module at which items are inducted into the item sortation system, the first module comprising a conveyor to support the items;
a second module coupled to the first module, wherein the second module comprises a first track for item shuttles and a second track for item shuttles, the first track disposed along a lower portion of the item sortation system and the second track disposed along an upper portion of the item sortation system;
a third module coupled to the first module and the second module, wherein the third module comprises a container matrix configured to support a first set of containers disposed along the lower portion of the item sortation system and a second set of containers disposed along the upper portion of the item sortation system;
a first actuation system configured to actuate the first set of containers from a first position to a second position, wherein the lower portion of the item sortation system is unoperational when the first set of containers is in the second position, and wherein the first set of containers is vertically aligned with the first track in the second position, the first actuation system comprising a pneumatic actuator; and
a controller configured to control the first actuation system.

2. The item sortation system of claim 1, further comprising:
a second actuation system configured to actuate the second set of containers from a first position to a second position, wherein the upper portion of the item sortation system is unoperational when the second set of containers is in the second position, and wherein the second set of containers is vertically aligned with the second track in the second position, the second actuation system comprising a pneumatic actuator.

3. The item sortation system of claim 1, wherein a footprint of the item sortation system is constant when the first set of containers is in the first position and in the second position.

4. The item sortation system of claim 1, wherein the controller is further configured to:

determine a section of the item sortation system for which to provide access corresponds to the first actuation system; and cause the first actuation system to be actuated.

5. A system comprising:

a first module, the first module comprising a conveyor;

a second module coupled to the first module, wherein the second module comprises a first track and a second track;

a third module coupled to the first module and the second module, wherein the third module comprises a container matrix configured to support a first set of containers disposed along a lower portion of the system and a second set of containers disposed along an upper portion of the system; and a first actuation system configured to actuate the first set of containers from a first position to a second position, wherein the first set of containers is vertically aligned with the first track in the second position, the first actuation system comprising a pneumatic actuator.

6. The system of claim 5, wherein the first module is a module at which items are inducted into an item sortation system, wherein the first track and the second track are tracks for item shuttles, and wherein the third module comprises a frame having a fixed position.

7. The system of claim 5, wherein the lower portion of the system is unoperational when the first set of containers is in the second position due to the first set of containers blocking the first track.

8. The system of claim 5, wherein the first track is disposed along the lower portion of the system and the second track is disposed along the upper portion of the system.

9. The system of claim 5, further comprising:

a set of guide rails disposed between the second module and the third module, wherein one or more portions of the set of guide rails are removable.

10. The system of claim 5, further comprising:

a controller configured to:

determine a section of the system for which to provide access corresponds to the first actuation system; and cause the first actuation system to be actuated.

11. The system of claim 5, further comprising:

a sensor configured to indicate that the third module is positioned in the default position.

12. The system of claim 5, wherein a footprint of the system is constant when the first set of containers is in the first position and in the second position.

13. The system of claim 5, further comprising:

a second actuation system configured to actuate the second set of containers from a first position to a second position, wherein the upper portion of the system is unoperational when the second set of containers is in the second position, and wherein the second set of containers is vertically aligned with the second track in the second position, the second actuation system comprising a pneumatic actuator.

14. The system of claim 13, wherein the second actuation system is separated from the first actuation system by at least one vertical level.

15. The system of claim 13, wherein actuation of the first actuation system provides access to a different internal portion of the system than actuation of the second actuation system.

16. An item sortation system comprising:

a first module, the first module comprising a conveyor;

a second module coupled to the first module, wherein the second module comprises a first track and a second track;

a third module coupled to the first module and the second module, wherein the third module comprises a container matrix configured to support a first set of containers disposed along a lower portion of the system and a second set of containers disposed along an upper portion of the system;

a first actuation system configured to actuate the first set of containers from a first position to a second position, wherein the first set of containers is vertically aligned with the first track in the second position, the first actuation system comprising a pneumatic actuator; and a second actuation system configured to actuate the second set of containers from a first position to a second position, wherein the second set of containers is vertically aligned with the second track in the second position, the second actuation system comprising a pneumatic actuator.

17. The item sortation system of claim 16, wherein the lower portion of the system is unoperational when the first set of containers is in the second position due to the first set of containers blocking the first track.

18. The item sortation system of claim 16, wherein a footprint of the system is constant when the first set of containers is in the first position and in the second position.

19. The item sortation system of claim 16, wherein the first module is a module at which items are inducted into an item sortation system, wherein the first track and the second track are tracks for item shuttles, and wherein the third module comprises a frame having a fixed position.

20. The item sortation system of claim 16, further comprising:

a controller configured to:

determine a section of the system for which to provide access corresponds to the first actuation system; and cause the first actuation system to be actuated.

* * * * *